W. M. Mason.
Corn Harvester.

No. 42,097.    Patented. Mar. 29, 1864.

Witnesses
B. Roberson
Henry Baldwin

Wm. M. Mason
by his Attorney
Wm. D. Baldwin

UNITED STATES PATENT OFFICE.

WILLIAM M. MASON, OF POLO, ILLINOIS.

IMPROVEMENT IN CORN-HARVESTERS.

Specification forming part of Letters Patent No. 42,097, dated March 29, 1864.

*To all whom it may concern:*

Be it known that I, WILLIAM M. MASON, of Polo, in the county of Ogle and State of Illinois, have invented a new and Improved Corn and Cane Harvester, of which the following is a full, clear, and exact description, reference being had to the accompanying drawings, which make part of this specification, and in which—

Figure 1:
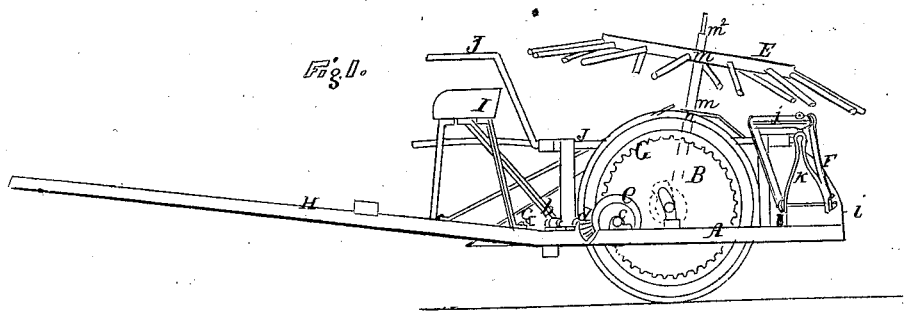
Figure 2:
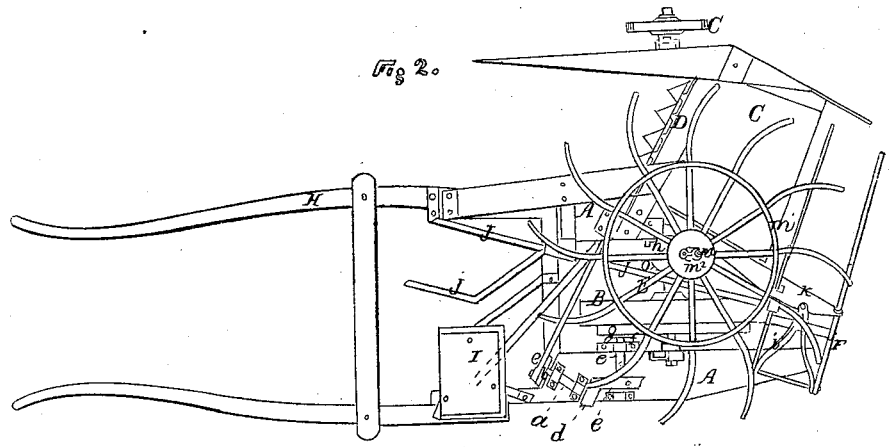
Figure 3:
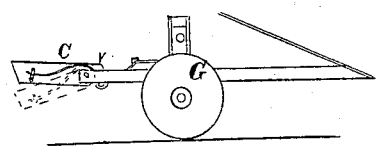
Figure 4:
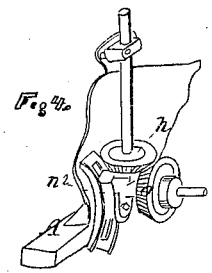

Figure 1 represents a view in elevation of one side of my improved machine; Fig. 2, a plan or top view of the same; Fig. 3, a view in elevation of a portion of the grain side of the machine, and Fig. 4 a view in perspective of the devices by which the reel-shaft is adjusted and driven.

Letters Patent of the United States numbered 33,204 were granted to me September 3, 1861, for an improved corn and cane harvester; and my present invention relates to further improvements in the details of that machine to render its operation more efficient.

The improvement herein claimed consists, first, in the combination of retracting-fingers with a spring-platform to control the discharge of the gavel; and, secondly, in the combination of the diagonal finger-beam, the adjustable reel, the spring-platform, and the retracting-fingers, for the purposes hereinafter set forth.

In the accompanying drawings, A represents the main frame; B, the driving-wheel; C, the spring-platform; D, the diagonally-arranged finger-beam; E, the reel, and F the retracting discharging-fingers.

It is well known that, whether the cutters work at right angles or diagonally to the main or gearing frame of a corn-harvester, a short pitman or a direct connection to a crank-arm causes the cutter to strike the standing stalks with such violence as to break the teeth of the cutter or jar the whole bar, and thus seriously interrupt the smoothness of its action. Now, to remedy this defective operation of the cutter-bar I attach to the main frame A and on the outer side of the driving-wheel B a short shaft, $a$, and secure it in proper bearings at a right angle to the plane of the cutter-bar. The outer end of this shaft carries a balance-wheel, $b$, to which the crank-pin of the pitman $c$ is connected by a proper bearing, the opposite end of the pitman being hinged to the cutter-bar. A bevel-pinion, $d$, on the inner end of the crank-shaft gears into a corresponding wheel on the counter-shaft $e$, mounted in suitable bearings in the main frame, and carrying on its inner end a spur-pinion, $f$, gearing into an internally-geared spur-wheel, $g$, secured upon the outer face of the driving-wheel, which, through this arrangement, vibrates the cutters when the harvester is in motion. By thus arranging the gearing outside of the driving-wheel I attain a length of pitman which relieves the cutters from sudden jars, and, as the cutters vibrate in a line diagonal to the path of the machine, they cut the corn with the least possible resistance. As the stalks are swept back by the reel they are severed by the cutting apparatus and fall with their butts resting upon the front edge of the diagonally-arranged spring-platform C, while their tops rest upon the retracting discharging-fingers F, which are attached to a bifurcated lever, $i$, fastened to a crank-rod, $j$, secured in proper bearings to permit its forward end to be within convenient reach of the driver's hand.

The fingers F are curved in an arc that tends to keep the stalks in or near the center of their length, and are as long as the platform is wide. This curvature of the fingers also permits their retraction through the slots in the side piece, $k$, and the brackets L, which contain rollers to diminish the friction in such a curve as to make their points come near to the ground as they pass from beneath the gavel. When as many stalks as are necessary to form a gavel are deposited upon the platform, the driver, by turning the crank-rod $j$ on its axis, withdraws the supporting-fingers F from beneath the stalks when the tops fall upon the ground, leaving the whole weight of the butts upon the spring-platform, which yields and allows them to slide off as the machine advances, and drop upon the ground in a compact gavel and out of the path of the machine in cutting the succeeding swath.

The reel E is mounted on a vertical spindle or standard, $m$, and consists of a series of radial arms bolted to a central hub, from which they diverge at right angles to the spindle, their outer ends being bent slightly downward and curved slightly in the direction in which they revolve. A guard-rim, $m'$, through which they pass, serves to prevent the stalks from entering too far within the spokes, and thus becoming entangled in the gearing. The reel can be adjusted on the standard m by means of a pin passing through a sleeve on the hub $m^2$, and through a series of holes in the spindle. This device controls the vertical adjustment of the reel-arms. The reel is likewise rendered adjustable both vertically and laterally by means of a block, n, near the middle of its length, (through which it slides freely,) which block is adjusted horizontally by means of a slot and set-screw, $n'$.

The axle of the driving-wheel is mounted in bearings traversing in slots curved in the arc of a circle, of which the counter-shaft e forms the center, for the purpose of raising and lowering the machine without deranging the gearing, being retained in any desired position by set-screws. The reel-shaft turns in a step, $n^2$, bolted to the block in which the inner end of the driving-axle turns, and is adjustable with it. A bevel-pinion, o, on this axle drives a corresponding one, p, of the same size on the reel-spindle. By this means the revolutions of the reel are rendered synchronous with those of the driving-wheel. This relation may, however, be varied by altering the relative size of the pinions by which the reel is driven. It will likewise be observed that the reel-step conforms to the adjustment of the driving-axle, by which means the reel and axle can be simultaneously adjusted and the relation of the gearing remain undisturbed.

From the foregoing description it is obvious that by my method of combining the main frame, the diagonal finger-beam, the adjustable reel, the spring-platform, and the retracting-fingers, I have secured a greatly-improved machine for cutting the stalks and delivering the gavels—one that operates lightly on the team, cuts smoothly, and delivers with precision.

The front edge of the platform C is pivoted to the frame underneath the finger-beam in such manner that its rear end is free to rise and fall. It is kept in a horizontal position by means of a coiled spring, r, (shown in Fig. 3,) which is sufficiently strong to sustain the platform when empty, but yields when the whole weight of the gavel is thrown upon it by the withdrawal of the retracting-fingers F.

The red lines in the drawings show the respective positions assumed by the several parts they represent.

The grain side of the machine is supported by a small adjustable wheel, G. The weight of the forward part of the machine is supported by the team, the tongue or shaft H being rigidly secured to the frame for that purpose. The driver's seat I is in front of the driving-wheel.

What I claim as my invention, and desire to secure by Letters Patent, is—

1. The combination of the retracting-fingers with the spring-platform, as and for the purposes set forth.

2. The combination of the diagonally-arranged finger-beam, the adjustable rotating reel, the spring-platform, and the vibrating fingers, substantially in the manner, and for the purposes set forth.

In testimony whereof I have hereunto subscribed my name.

WM. M. MASON.

Witnesses:
  EDM. F. BROWN,
  WM. D. BALDWIN.